(12) United States Patent
Alff

(10) Patent No.: US 7,434,455 B2
(45) Date of Patent: Oct. 14, 2008

(54) DEVICE AND PROCESS FOR MEASURING AND REGULATING THE PRESSURE OF A TIRE

(75) Inventor: Denis Alff, Malauzat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 287 days.

(21) Appl. No.: 11/340,677

(22) Filed: Jan. 27, 2006

(65) Prior Publication Data
US 2006/0174943 A1    Aug. 10, 2006

(30) Foreign Application Priority Data
Jan. 27, 2005    (FR) .................................. 05 00827

(51) Int. Cl.
*G01M 17/02* (2006.01)
(52) U.S. Cl. ........................................ 73/146; 152/224
(58) Field of Classification Search .................. 73/146; 152/224, 429
See application file for complete search history.

(56) References Cited

U.S. PATENT DOCUMENTS 4,782,878 A * 11/1988 Mittal ......................... 152/417
5,181,977 A *  1/1993 Gneiding et al. ............ 152/429
5,674,332 A    10/1997 Battocchio
6,212,464 B1   4/2001 Skotnikov
2004/0055291 A1 3/2004 Meydieu et al.

FOREIGN PATENT DOCUMENTS

DE             32 36 594        5/2005

\* cited by examiner

*Primary Examiner*—Andre J Allen
(74) *Attorney, Agent, or Firm*—Buchanan Ingersoll & Rooney PC

(57) ABSTRACT

The pressure of a vehicle tire fitted on a vehicle wheel is measured and regulated, utilizing a source of compressed air, a check valve leading to an interior of the tire, and an air feed circuit connecting the air source to the check valve. Compressed air is fed from the air source into the circuit and against the check valve to tend to open the check valve. A pressure drop is imposed at a point in the circuit, wherein a resulting pressure drop in the circuit downstream of such point and upstream of the check valve is less than 10% of the pressure drop at the point. A measurement is made of the pressure in the circuit at a location downstream of the point, or in the tire itself. The evolution of the pressure measured in step D is analyzed as a function of time, to determine whether the check valve has been opened.

21 Claims, 4 Drawing Sheets

DEVICE AND PROCESS FOR MEASURING AND REGULATING THE PRESSURE OF A TIRE

The present application claims priority under 35 U.S.C. § 119 to French Application No. 05/00827 filed on Jan. 27, 2005.

BACKGROUND

The present invention concerns a device and process for measuring and regulating the pressure of at least one tire fitted on a vehicle wheel.

From the prior art, in particular from the document EP-B1-0 671 998, a device is already known for measuring and regulating the pressure of a tire fitted on a vehicle wheel, of the type comprising a source of compressed air, an air feed circuit that connects the said source to the tire, and pressure measurement means in the circuit or in the tire.

In the remainder of this description the circuit will be regarded as extending from the air source towards the tire. Thus, "upstream" refers to a part of the circuit which is closer to the air source and "downstream" to a part of the circuit closer to the tire.

The feed circuit generally comprises a check valve which opens when the pressure in the circuit exceeds the pressure in the tire by a predetermined value.

When the tire is fed with air by a device of the above type, the pressure in the circuit or in the tire is generally unstable. Inasmuch as the pressure is unstable, it is difficult to measure the pressure in the circuit or in the tire exactly. To avoid this problem it has therefore been proposed to measure the pressure of a tire by the following procedure:
  the circuit is fed with compressed air so as to open the check valve and place the circuit and the inside of the tire in fluid communication,
  the compressed air feed is stopped,
  stabilization of the pressure in the circuit and tire is awaited, and
  the pressure in the circuit or tire is measured.

This process enables a precise measurement of the pressure in the tire to be obtained during its inflation, but entails frequent stopping of the compressed air feed. The process is therefore particularly lengthy and restrictive.

Moreover, with this tire pressure measurement process, each time the pressure in the circuit is measured some air is injected into the tire, and this increases its pressure. Thus, too many pressure measurements risk increasing the tire pressure abnormally.

The purpose of the invention is to overcome pressure instability problems so as to enable more precise regulation of the pressure in the tire.

SUMMARY OF INVENTION

To that end, the object of the invention is a device of the above type for measuring and regulating the pressure of at least one tire fitted on a vehicle wheel, characterized in that the circuit comprises means interposed in the circuit, which are designed to bring about a forced pressure drop, the pressure drop of the circuit downstream from the pressure drop production means being less than 10% of the pressure drop produced by the pressure drop production means, and in that the pressure measurement means measure the pressure, whether in the tire or in the circuit, downstream from the pressure drop production means.

In what follows, "downstream part" and "upstream part" will be used to designate respectively the parts of the circuit downstream and upstream from the pressure drop production means.

The pressure drop production means in the circuit enable the pressure of the air injected into the downstream part of the circuit by the air source to be reduced and made more uniform. Thus, pressure instability problems in the circuit are overcome and this, in particular, allows the pressure in the tire to be estimated by measuring the pressure in the circuit before the circuit and tire are placed in communication. It also enables reliable pressure measurements to be made during inflation, without any need to await pressure stabilization in the tire and in the circuit.

A pressure regulation device according to the invention can also have one or more of the following characteristics:
  The pressure drop in the circuit downstream from the pressure drop production means is between 3% and 6% of the pressure drop of the pressure drop production means. Tests have shown that these values enable a particularly stable pressure to be obtained in the circuit.
  The pressure drop production means comprise a constriction. A localized reduction of the circuit cross-section in effect enables a sufficient pressure drop to be obtained.
  The constriction comprises at least one nozzle.
  The downstream part of the circuit comprises a check valve which opens when the pressure in the said downstream part of the circuit exceeds the pressure in the tire by a predetermined value, preferably close to zero. For example, a one-way valve is used which, during inflation, allows air to be injected into the tire in a simple way by bringing the circuit to a pressure higher than that in the tire. As soon as the tire pressure exceeds the pressure in the circuit, the one-way valve closes and this prevents the tire from deflating.
  The downstream part of the circuit comprises a solenoid valve interposed upstream from the valve. The presence of solenoid valves enables the pressure of a tire to be regulated independently of the vehicle's other tires.
  The device regulates the pressure of two tires, and comprises a solenoid valve common to the two air feed circuits of the two tires, the parts of the circuits downstream from the said solenoid valve being in fluid communication. This configuration of the pressure regulation device enables the pressure to be equilibrated between the two tires. This is particularly advantageous for ensuring that the two tires on the front or on the rear axle of the vehicle are inflated to an identical pressure.
  The device is designed to regulate the pressure of two tires, each feed circuit comprising a solenoid valve, the said solenoid valve being arranged so as to allow fluid communication between the parts of the circuits located upstream from the solenoid valves. Thanks to this configuration it is possible to re-use the compressed air from the downstream part of the circuit of a tire that has just been inflated, to increase in advance the pressure in the downstream part of the circuit of another tire which it is desired to inflate.
  The check valve is carried by the wheel.
  The device comprises means for analyzing the evolution of the pressure measured by the pressure measurement means as a function of time. These analysis means can detect a variation of the pressure evolution due to the opening of the check valve. A measurement of the circuit pressure at the moment when the check valve opens enables the tire pressure to be estimated.

The circuit comprises several elements whose junctions with one another, with the air source or with the tire are designed to allow an air leak at a flow rate much smaller than the flow rate coming from the source. This property enables the circuit to return to atmospheric pressure after having been pressurized, but without this air leak disturbing the regulation of the tire pressure.

The pressure measurement means consist of a pressure sensor placed in fluid communication with the upstream branch of the feed circuit and downstream from the pressure drop production means.

The pressure measurement means consist of a pressure sensor in fluid communication with the internal cavity of the tire.

The device according to the invention can advantageously be associated with a device for measuring the pressure of a vehicle's tires, of the type comprising means for comparing the rotation speeds of at least two tires.

A tire pressure measurement device comprising means for comparing the rotation speeds of at least two tires is known from the prior art. This device uses the following property: when a tire loses pressure, it collapses under the effect of the vehicle's load, and this modifies its circumference. Consequently, for a given linear speed a less inflated tire has a rotation speed different from that of a correctly inflated tire.

By comparing the rotation speeds of the vehicle's tires, it therefore becomes possible to determine the relative pressures of the different tires.

However, when rounding a curve an external tire always rotates faster than an internal tire. Consequently, in certain conditions of the vehicle's use such as on winding mountain roads, the rotation speed differences of the tires are not due solely to differences of their pressures. In certain situations the comparison of tire rotation speeds is therefore not effective for determining the different tire pressures of the vehicle. It is thus advantageous to couple means for comparing the tire rotation speeds with a device for regulating the pressure of a tire as described earlier, so as to obtain a tire pressure measurement device that works regardless of the tire's conditions of use.

According to a particular embodiment, the device comprises means for estimating the pressure in a tire from comparison means and/or pressure measurement means. Thanks to this special form the pressure in the tire is estimated either from comparison means when the tire's conditions of use allow this, or from the pressure sensor in the downstream part of the circuit in the remaining cases. Since the comparison means are software means, they are simpler to use and consume less energy than the device for regulating the pressure in a tire according to the invention, while also enabling quasi-continuous monitoring. It is therefore advantageous to use the comparison means as often as possible to estimate the tire pressure.

Since the invention enables pressure instability problems in the air feed circuit or in the tire to be overcome, it is conceivable to measure or at least estimate the pressure in the tire as often as possible by implementing a process of type different from that described above, which in particular avoids the risk of abnormal tire inflation.

Thus, another object of the invention is a process for measuring and regulating the pressure of an automobile vehicle tire by means of a measurement and regulation device such as that defined earlier, in which the pressure measurement means measure the pressure in the circuit, characterized in that:
   the circuit is fed with compressed air,
   the pressure in the circuit is measured,
   the evolution of the pressure measured is analyzed as a function of time, Thanks to the invention, monitoring the evolution of the measured pressure makes it possible to obtain a lower value estimate of the tire pressure based on measurement of the pressure in the circuit before it is placed in communication with the tire. Consequently, the tire pressure measurement does not necessarily introduce air into the tire.

A process for measuring and regulating the pressure according to the invention can also comprise one or more of the following characteristics:

The evolution of the measured pressure is analyzed so as to detect an event chosen from between an event that characterizes the opening of the check valve, and an event showing that a given pressure threshold has been exceeded. These two events are particularly interesting for estimating the pressure inside the tire. In effect, the first event demonstrates that the pressure in the circuit is essentially equal to the pressure in the tire. The second event shows that the tire pressure is at least equal to the predetermined pressure.

When the first event detected is the opening of the check valve, the air feed to the circuit is maintained so as to inflate the tire. For the tire to be inflated, the check valve must first be open. Once the check valve is known to be open, i.e. when the first event is detected, the tire is inflated by maintaining the air feed.

When the first event detected is that the predetermined pressure threshold has been exceeded, the air feed to the circuit is stopped and the pressure in the tire is estimated as a function of the threshold. This enables a lower value estimate of the tire pressure to be obtained.

When the predetermined threshold is exceeded before the check valve is opened, the air feed to the circuit is stopped and the tire pressure is assimilated to the pressure indicated by the sensor. In certain situations it is desired to know the exact pressure in the tire even if that pressure is higher than a predetermined minimum threshold pressure. Then, the feed is stopped only when the opening of the check valve has been detected.

The process is intended for measuring and regulating the pressure in a first and a second tire by means of a regulation device as defined earlier, in which, after having measured or regulated the pressure in the first tire, the solenoid valve of the second tire's feed circuit is opened so that the pressure in the first tire's feed circuit is reduced abruptly, to close the check valve of the first tire's circuit. This stage is applicable in any variant of the device according to the invention.

BRIEF DESCRIPTION OF THE DRAWINGS

The invention will be better understood on reading the description presented below, which is given solely as an example and which refers to the attached drawings, showing.

DETAILED DESCRIPTION OF PREFERRED EMBODIMENTS

Figure 1:
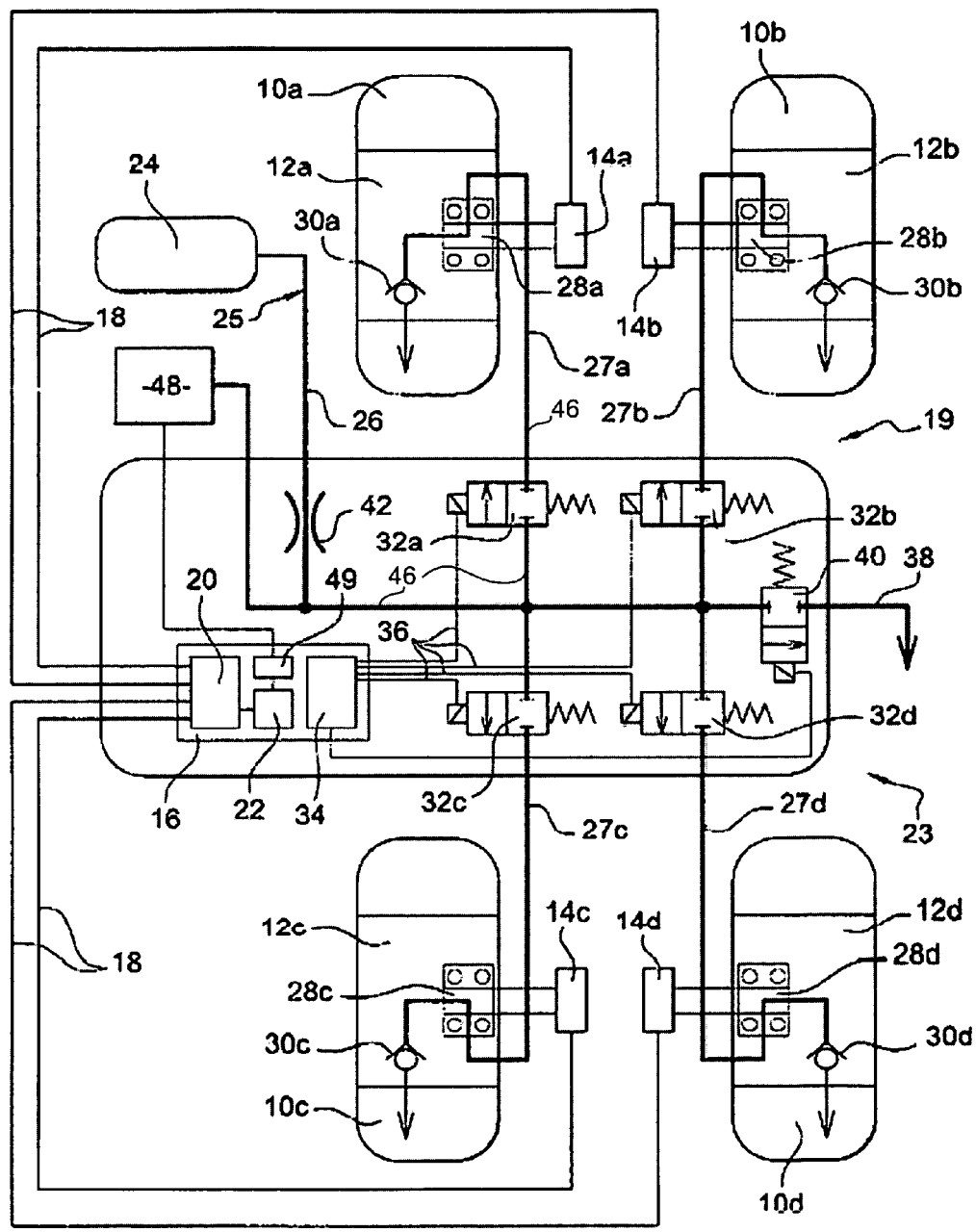
FIG. 1: Schematic illustration of a device for regulating the pressures of the tires of an automobile vehicle, according to a first embodiment of the invention

FIG. 1 shows a schematic representation of four tires of an automobile vehicle. These four tires are denoted by the general indices $10a$, $10b$, $10c$ and $410d$. The tires $10a$ and $10b$ are part of a front axle of the vehicle, as distinct from the tires $10c$ and $10d$ which are part of a rear axle of the vehicle. Each tire $10a$, $10b$, $10c$, $10d$ is fitted on a vehicle wheel $12a$, $12b$, $12c$, $12d$.

Each wheel $12a$, $12b$, $12c$, $12d$ is connected to a sensor $14a$, $14b$, $14c$, $14d$ that detects the rotation speed of the wheel. Such sensors $14a$, $14b$, $14c$, $14d$ are classically used in wheel anti-blocking systems of the ABS (Anti-Blocking System) type. Each of the sensors $14a$, $14b$, $14c$, $14d$ is connected to a vehicle computer 16 by means of electric cables 18.

The measurements furnished by the sensors $14a$, $14b$, $14c$, $14d$ are treated by wheel rotation speed comparison means 20 integrated in the computer 16.

The computer 16 also comprises means 22 for estimating the pressure in the tires $10a$, $10b$, $10c$, $10d$, capable of using data furnished by the tire rotation speed comparison means 20 for estimating the tire pressures. The estimate of tire pressures provided by the means 22 is correct in most cases, but it can happen, particularly on winding roads, that this pressure estimate is incorrect.

Consequently, the automobile vehicle comprises a device 19 for measuring and regulating the tire pressures, which besides the tire rotation speed comparison means 20, also comprises a device 23 for measuring and regulating the pressure according to the invention connected to the pressure estimation means 22. Thus, the means 22 estimate the tire pressures from the comparison means 20 and/or from pressure measurements furnished by the device 23.

The tire pressure regulation device 23 comprises a source 24 of compressed air that can be controlled by the computer 16. This air source 24 is for example a compressor or a bottle of compressed air, whose means of operation or of being connected in communication are not shown.

The air source 24 is connected to the four tires $10a$, $10b$ $10c$, $10d$ by a feed circuit 25. According to a first embodiment, the feed circuit 25 comprises an upstream branch 26 connected to four downstream branches $27a$, $27b$, $27c$, $27d$. The upstream branch 26 is connected to the air source 24 and each downstream branch $27a$, $27b$, $27c$, $27d$ is connected to a tire by means of a bearing $28a$, $28b$, $28c$, $28d$ with an air passage and a check valve $30a$, $30b$, $30c$, $30d$. Note that in FIG. 1 the four bearings illustrated correspond to bearings for drive axles.

The check valves $30a$, $30b$, $30c$, $30d$ are classical one-way valves which open when the pressure in the downstream branch $27a$, $27b$, $27c$, $27d$ exceeds the pressure in the tire $10a$, $10b$, $10c$, $10d$ by a predetermined value, preferably close to zero. Generally, the predetermined value is small and of the order of 10 millibars for a valve of good quality. Since this value is virtually constant throughout the life of the valve, it is easily modelled and taken into account when measuring the pressure in the tire.

A solenoid valve $32a$, $32b$, $32c$, $32d$ is interposed in each downstream branch $27a$, $27b$, $27c$, $27d$ between the tire and the air source 24. The solenoid valves $32a$ $32b$, $32c$, $32d$ are electrically connected to control means 34 of the computer 16 by electric cables 36. The control means 34 enable the opening or closing of the downstream branches $27a$, $27b$, $27c$, $27d$ of the feed circuit 25 to be controlled independently.

An outlet circuit 38 comprising a solenoid outlet valve 40 connected to the control means 34, is connected to the upstream branch 26 of the feed circuit 25.

The upstream branch 26 of the circuit 25 has a constriction 42 which constitutes means for producing a pressure drop. The dimensions of the constriction 42 are such that the pressure drop in the part 46 of the circuit downstream from the constriction, more simply called the downstream part 46, is less than 10% of the pressure drop in the constriction 42. Thus, when the solenoid valve $32a$ is open and the other four are closed, the downstream part 46 comprises the part of the upstream branch 26 located downstream from the constriction 42 and the downstream branch $27a$ of the circuit 25 connected to the tire. It will be remembered that the pressure drop undergone by a fluid circulating in a circuit corresponds to the difference between the pressure of the fluid when it enters the circuit and its pressures when it emerges therefrom. It is generally accepted that the pressure drop is proportional to the length of the circuit, the square of the fluid's propagation speed in the circuit, and inversely proportional to the diameter of the circuit.

The pressure drop in a circuit can be estimated either by direct measurement in the circuit 1 itself, or in a reproduction of the circuit, or by mathematical modelling.

The constriction 42 gives rise to most of the pressure drop in the feed circuit 25. Consequently, the air pressure in the downstream part 46 is essentially uniform, even during inflation phases. A constriction producing such a pressure drop can be obtained, in a pipe of nominal diameter larger than 2 mm, by means of a nozzle of reduced cross-section, for example of diameter 1 mm.

The pressure regulation device 23 according to the invention also comprises means 48 for measuring the air pressure in the downstream part 46 of the circuit. These means 48 consist of a classical pressure sensor 48. The pressure sensor 48 is connected to means 49 for analyzing the evolution of the pressure measured by the sensor 48. The analysis means 49 are part of the computer 16 and are connected to the tire pressure estimation means 22. Below, the operation of the device 23 for measuring and regulating the pressure of the vehicle's tires will be described with reference to FIGS. 3 to 6. As mentioned earlier, in most cases the tire pressure is estimated by the means 22 from the comparison means 20. In the remaining cases the tire pressure estimation means 22 use the pressure regulation device 23 according to the invention.

Below, a more detailed description is given of the process for pressure measurement and regulation by means of the first embodiment of the regulation device 23 according to the invention. This process makes it possible to:

check that the pressure in the tire is at least equal to a predetermined pressure threshold $P_0$;
measure the pressure in the tire; or
inflate the tire.

The regulation device 23 according to the first embodiment of the invention enables independent action on any of the vehicle's tires. Consider for example the tire $10a$.

To measure and/or regulate the pressure of tire $10a$, the control means 34 of the computer 16 first cause the solenoid valve $32a$ to open and the other solenoid valves $32b$, $32c$, $32d$ and if necessary 40 to close.

Then, the computer actuates the beginning of the compressed air feed into the circuit 25. Thanks to the solenoid valves only the downstream branch $27a$ is supplied with air.

During the air feed into the circuit 25, the computer measures the pressure in the circuit by means of the pressure sensor 48. Thanks to the constriction 42, it is known that the pressure measured is essentially equal to the pressure exerted upstream from the check valve 30*a*, which is therefore subjected on one side to the pressure in the tire 10*a* and on the other side to the pressure in the downstream branch 27*a* measured by the sensor 48. The relative values of these two pressures determine whether the check valve is open or closed.

The evolution of the pressure measured as a function of time is analyzed by the analysis means 49 so as to detect the opening of the check valve 30*a* and/or whether the predetermined pressure threshold $P_0$ has been exceeded.

It is easy to detect the opening of the check valve 30*a* by analyzing the evolution of the slope of the curve giving the pressure measured as a function of time. In effect, when the valve is closed the air source 24 feeds a small volume consisting only of the circuit 25. The pressure in the circuit 25 measured by the sensor 48 therefore increases very rapidly with time. In contrast, when the check valve is open the air source 24 feeds a large volume comprising both the circuit 25 and the tire 10*a*. Since the air source then has to fill a larger volume than when the check valve is closed, the pressure measured by the sensor 48 increases more slowly. Consequently, the means 49 analyze the slope of the curve expressing measured pressure as a function of time to detect the opening of the check valve.

Depending on the times when the two events defined earlier are detected, the following four configurations can be encountered.

Figure 3:
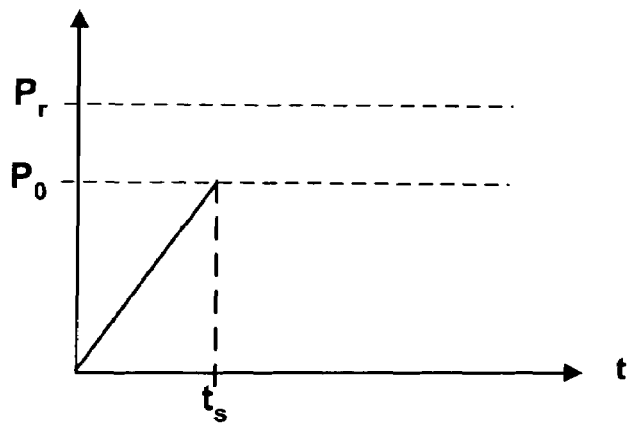

In the case of FIG. 3, the first event detected by the analysis means 49, at time $t_s$, is that the predetermined pressure value $P_0$ has been exceeded. In this case, since the opening of the check valve has not yet been detected, it is known that the actual pressure $P_r$ in the tire is at least equal to the value $P_0$. If this value $P_0$ is regulated as a minimum admissible pressure value, the air feed into the circuit is stopped. The pressure in the tire is thus estimated without having injected air into the tire. The solenoid outlet valve 40 is then used to depressurize the circuit.

Figure 4:
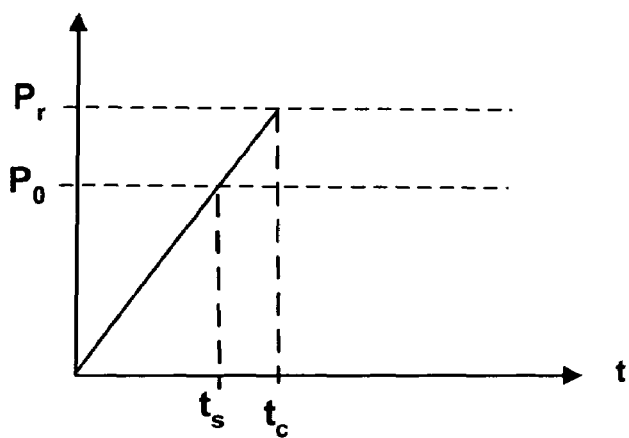

In the case of FIG. 4 the first event detected by the analysis means 49, at time $t_s$, is also that the predetermined pressure value $P_0$ has been exceeded. However, if the computer wants to know the exact value of the tire pressure (although it is above the minimum admissible value), it maintains the air feed until, at time $t_c$, the opening of the check valve is detected. The pressure $P_r$ measured at the time $t_c$ is equal to the actual pressure in the tire. The solenoid outlet valve 40 is then used to depressurize the circuit.

Figure 5:
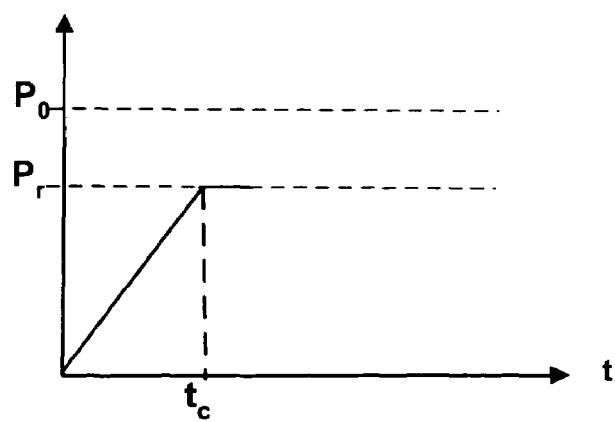

In the case of FIG. 5 the first event detected by the analysis means 49 is the opening of the check valve at time $t_c$, before the pressure value $P_0$ has been reached. If the computer 16 wants to measure the actual pressure in the tire without inflating it, it stops the air source. The pressure $P_r$ measured at time $t_c$ is equal to the pressure in the tire. The solenoid outlet valve 40 is then used to depressurize the circuit.

Figure 6:
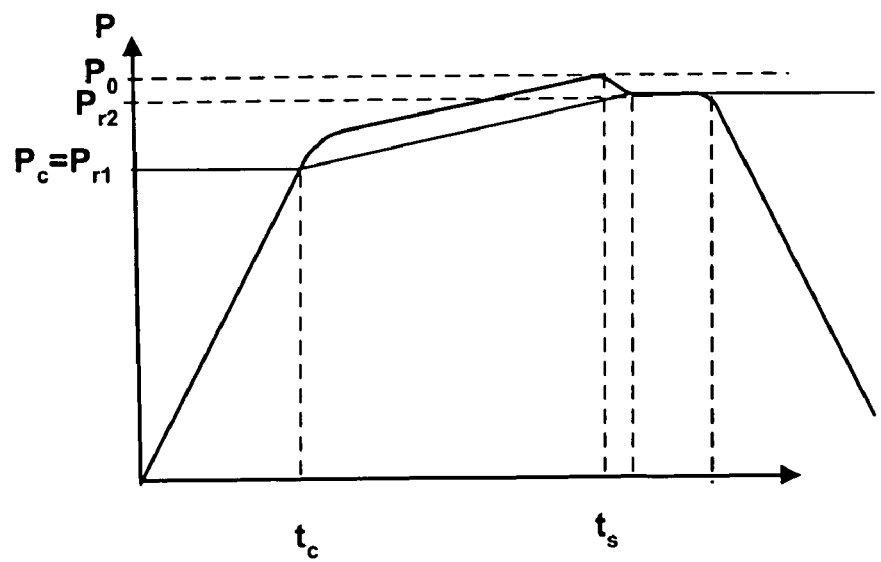
FIGS. 3 to 6: Graphs representing the pressure evolution in the air feed circuit of the device illustrated in FIG. 1, as a function of time, in four different configurations.

Finally, in the case of FIG. 6 the first event detected by the analysis means 49 is the opening of the check valve at time $t_c$. The pressure value $P_{r1}$ measured then is lower than $P_0$. The air feed is maintained and the pressure in the tire increases with time. FIG. 6 shows that during inflation, the pressure measured (represented by a thick curve) is slightly higher than the actual pressure in the tire (represented by a thin curve). This difference is due to the air flow.

At a time $t_s$ the pressure measured exceeds the threshold value $P_0$. The computer then stops the air feed and the pressure in the circuit and in the tire settles at a value $P_{r2}$. Measurement of this equilibrium pressure by the pressure sensor 48 indicates the exact value of the tire pressure. Once this pressure has been measured, the computer actuates the solenoid outlet valve 40 with the result that the pressure in the circuit decreases very rapidly. The pressure difference between the circuit and the tire automatically closes the check valve 30*a*.

The process just described can be applied to each of the vehicle's tires by actuating the solenoid valves in succession In particular, to reduce the energy consumed by the air source 24, the solenoid valves can be acted upon as follows.

Assume that the tire 10*a* has been acted upon. The downstream branch 27*a* is therefore pressurized. Rather than reducing the pressure in the downstream branch 27*a* by means of the solenoid outlet valve 40, the solenoid valve of another tire can be opened, for example solenoid valve 32*b*, so as to transfer the pressure from one branch to the other. The abrupt pressure drop of the order of several hundred millibars is enough to close the check valve 30*a*. The pressure in the downstream branch 27*b* of tire 10*b* is then increased even before beginning to feed the circuit with air from the air source 24. This also enables the time during which the downstream branch 27*b* is pressurized to be decreased.

Figure 2:
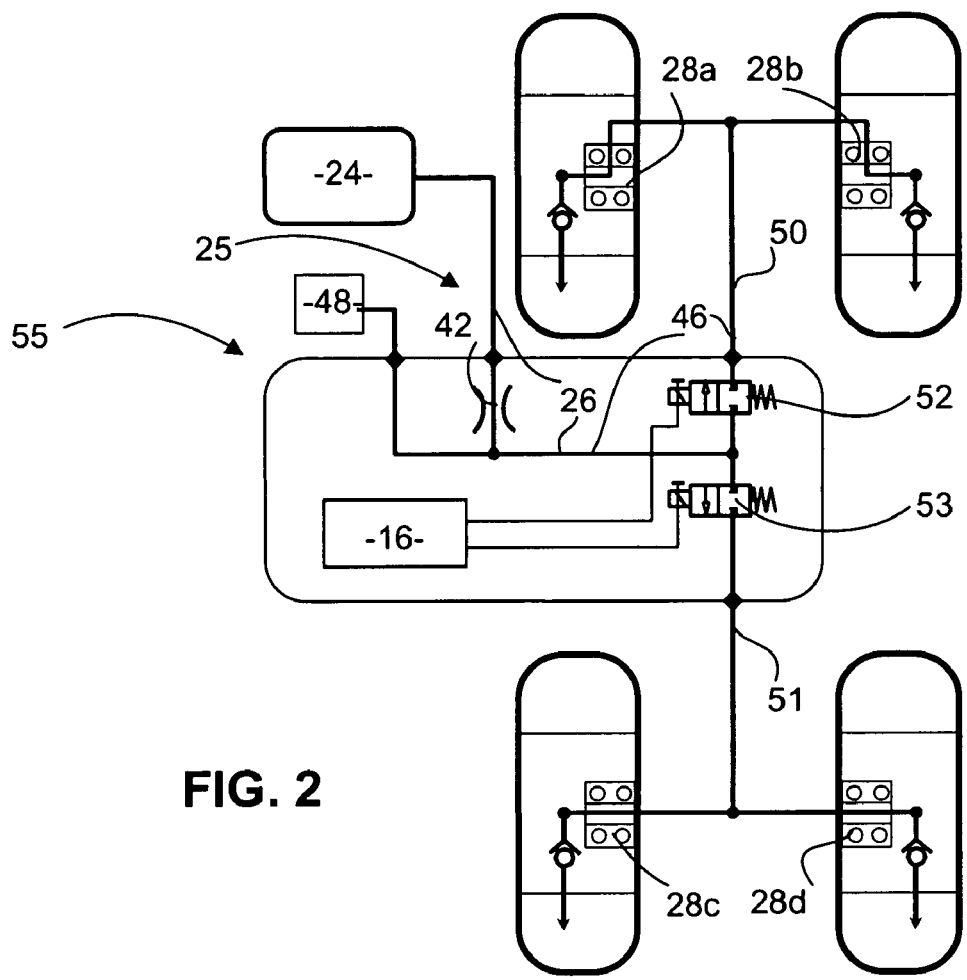
FIG. 2: Schematic illustration of a second embodiment of a regulation device according to the invention

According to a second embodiment illustrated in FIG. 2, the upstream branch 26 of the feed circuit 25 is connected to two downstream branches 50 and 51. The downstream branch 50 is connected to the two tires 10*a* and 10*b*, and the downstream branch 51 is connected to the two tires 10*c* and 10*d*. The solenoid valves 52 and 53 are interposed respectively in the downstream branches 50 and 51. This special configuration of the regulation device 55 enables the number of solenoid valves in the device to be reduced and consequently reduces its cost. It also enables the pressure of the two tires on a given axis to be equilibrated, as described earlier. In the embodiment shown, the air-passage bearings 28*a* and 28*b* correspond to a drive axle and the bearings 28*c* and 28*d* to a driven axle.

Since the tires are connected in pairs to a downstream branch of the feed circuit, opening the electric valve 52 and feeding the circuit from the air source 24 pressurizes both of the check valves 30*a* and 30*b*.

The analysis means 49 can detect whether neither of the two check valves 30*a* and 30*b* is open, or only one of them is open, or they are both open. Consequently, the means 49 analyze the evolution of the pressure measured by the sensor 48 as a function of time in such manner as to detect the opening of one check valve, the opening of both check valves, or the fact that a predetermined pressure threshold has been exceeded.

It is particularly interesting to detect the opening of both check valves, since it is then known that the two tires 10*a* and 10*b* are at the same pressure.

Suppose that during the feeding of air, the check valve 30*a* is the first to open. This means that tire 10*a* is less inflated than tire 10*b*. Continuing the air feed thus inflates only tire 10*a* until the opening of the check valve 30*b* is detected. The simultaneous inflation of both tires can then continue until the predetermined pressure threshold is reached.

The pressure regulation device 55 illustrated in FIG. 2 does not have a solenoid outlet valve. Closure of a check valve in a downstream branch is thus obtained by diverting the compressed air to another branch. The feed circuit is then depressurized to atmospheric pressure by virtue of a calibrated leak or incomplete air-tightness at the level of the joints between the various elements of the circuit, for example at the hub/transmission link, at the contact face between the wheel and the disc brake, or at the outer diameter of the bearing. Incomplete air-tightness at the level of these joints can be obtained by placing metallic components in close contact, which does not enable perfectly air-tight joints to be obtained. Tests have shown that such leaks amount for example to 2 L/min per wheel, a low value compared with the flow rate from the air source which is perhaps of the order of 20 L/min.

This pressure measurement and regulation device 55 shown in FIG. 2 can of course be associated with means for comparing the rotation speeds of the wheels of a vehicle, as described and illustrated in FIG. 1.

According to a variant not illustrated, the size of the constriction is such that the pressure drop in the downstream part is less than 10% of the total pressure drop created by the circuit between the air source and the tire, and more preferably is between 3% and 6% of the total pressure drop.

Figure 7:
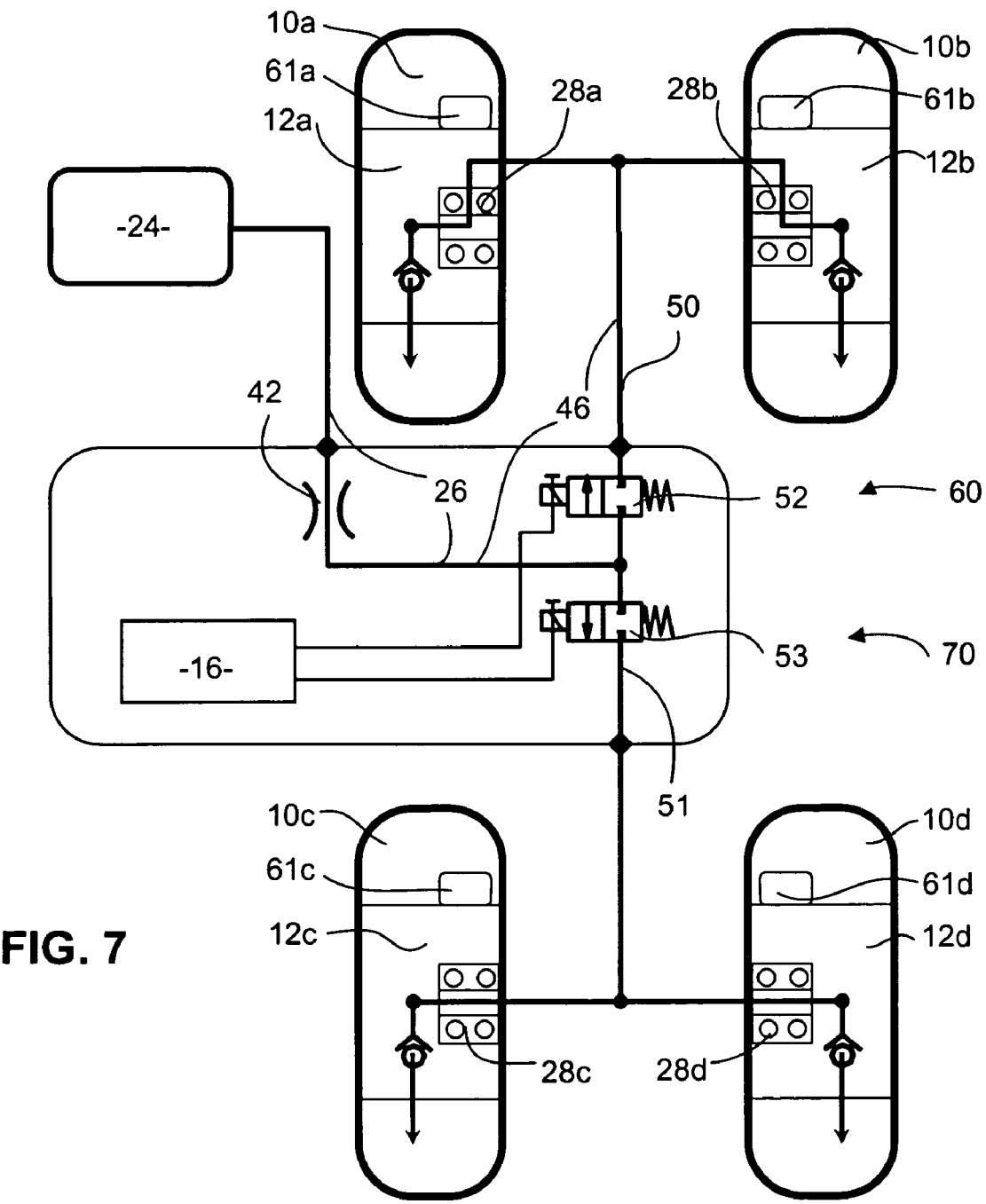
FIG. 7: Schematic illustration of a pressure regulation device according to a third embodiment of the invention.

Finally, another variant 60 is shown in FIG. 7. This figure shows a tire pressure measurement device 70 in which each tire 10a, 10b, 10c, 10d comprises a sensor 61a, 61b, 61c, 61d measuring its pressure and associated with a regulation device 60. The sensors are of the usual type comprising means for the radio transmission of the pressure values to a computer in the vehicle; the said computer can be the computer 16. The regulation device is similar to that illustrated in FIG. 2, the only difference being that it has no pressure sensor in the upstream branch of the feed circuit. Neither are any associated analysis means 49 necessary. As before, the constriction in the feed circuit enables the pressure downstream from the constriction to be stable and essentially equal to the pressure in the tire during its inflation.

In this variant the inflation phases are advantageously initiated by the measurement of an insufficient pressure in one of the vehicle's tires. It is therefore of no use to increase the emission frequency of the sensor. The regulation device can be controlled by a given, fixed or variable inflation duration. In particular, that duration can be determined as a function of the increase in pressure to be expected.

The invention claimed is:

1. Device for measuring and regulating the pressure of at least one tire fitted on a vehicle wheel comprising:
   a source of compressed air,
   an air feed circuit that connects the source to the tire, and
   means for measuring the pressure in the circuit or in the tire;
   wherein the device further comprises means interposed in the circuit designed to produce a forced pressure drop, the pressure drop of the circuit downstream from the pressure drop production means being less than 10% of the pressure drop produced by the pressure drop production means, and wherein the pressure measurement means measuring the pressure in the tire or in the circuit are downstream from the pressure drop production means; and the device further comprising means for analyzing the evolution of the pressure measured by the pressure measurement means, as a function of time.

2. Device according to claim 1, in which the pressure drop of the circuit downstream from the pressure drop production means is between 3% and 6% of the pressure drop of the pressure drop production means.

3. Device according to claim 1, in which the pressure drop production means comprise a constriction.

4. Device according to claim 3, in which the constriction comprises at least one nozzle.

5. Device according to claim 1, in which the downstream part of the circuit comprises a check valve which opens when the pressure in the downstream part of the circuit exceeds the pressure in the tire by a predetermined value, preferably close to zero.

6. Device according to claim 5, in which the downstream part of the circuit comprises a solenoid valve interposed upstream from the check valve.

7. Device according to claim 6, for regulating the pressure of two tires, comprising a solenoid valve common to the two air feed circuits of the two tires, the parts of the circuits located downstream from the said solenoid valve being in fluid communication.

8. Device according to claim 6, for regulating the pressure of two tires, each feed circuit of which comprises a solenoid valve, the said solenoid valves being arranged so as to enable fluid communication between the parts of the feed circuits located upstream from the solenoid valves.

9. Device according to claim 5, in which the check valve is carried by the wheel.

10. Device according to claim 1, in which the circuit comprises several elements whose junctions between one another, with the air source or with the tire, are designed to enable an air leak whose flow rate is much smaller than the flow rate coming from the source.

11. Device according to claim 1, in which the pressure measurement means comprises a pressure sensor in fluid communication with the upstream branch of the circuit and downstream from the pressure drop production means.

12. Device according to claim 11, wherein the pressure measurement means further comprises means for comparing the rotation speeds of at least two wheels.

13. Device according to claim 12, wherein the pressure measurement means further comprises means for estimating the pressure in a tire from said comparison means and/or from said pressure measurement means.

14. Device according to claim 1, in which the pressure measurement means comprises a pressure sensor arranged in fluid communication with the internal cavity of the tire.

15. Process for measuring and regulating the pressure of at least one tire of an automobile vehicle by means of a device according to any of claims 1 to 10 or claim 12 or claim 13, in which the pressure measurement means measure the pressure in the circuit, wherein:
   the circuit is fed with compressed air,
   the pressure in the circuit is measured, and
   the evolution of the pressure measured is analyzed as a function of time.

16. Process according to claim 15, in which the evolution of the pressure measured is analyzed so as to detect an event chosen from between an event that characterizes the opening of the check valve and one that indicates that a predetermined pressure threshold ($P_0$) has been exceeded.

17. Process according to claim 16 in which, when the first event detected is the opening of the check valve, the air feed into the circuit is maintained so that the tire is inflated.

18. Process according to claim 16 in which, when the first event detected is that the predetermined pressure threshold ($P_0$) has been exceeded, the air feed into the circuit is stopped and the pressure in the tire is estimated as a function of the said threshold.

19. Process according to claim 16 in which, when the opening of the check valve occurs after the predetermined pressure threshold ($P_0$) has been exceeded, the air feed to the circuit is stopped and the pressure in the tire is assimilated to the pressure measured by the pressure measurement means.

20. Process for the measurement and regulation of the pressure in a first and a second tire by means of a device according to claim 8 or claim 11 or claim 14, in which, after having measured or regulated the pressure of the first tire, the solenoid valve of the feed circuit of the second tire is opened so as to reduce abruptly the pressure in the feed circuit of the first tire in order to close the check valve of the circuit of the first tire.

21. Process for measuring and regulating the pressure of at least one tire fitted on a vehicle wheel, comprising the steps of:
- A) providing a source of compressed air, a check valve leading to an interior of said at least one tire, and an air feed circuit connecting said source to said check valve;
- B) feeding compressed air from said source into said circuit and against said check valve to tend to open said check valve;
- C) forcing a pressure drop at a point in the circuit, wherein a resulting pressure drop in the circuit downstream of said point and upstream of the check valve is less than 10% of the pressure drop at said point;
- D) measuring the pressure in the circuit at a location downstream of said point, or in the at least one tire; and
- E) analyzing, as a function of time, the evolution of the pressure measured in step D, to determine whether the check valve is opened during step C.

* * * * *